US011284139B1

(12) United States Patent
Cava

(10) Patent No.: US 11,284,139 B1
(45) Date of Patent: Mar. 22, 2022

(54) STATELESS RE-DISCOVERY OF IDENTITY USING WATERMARKING OF A VIDEO STREAM

(71) Applicant: HULU, LLC, Santa Monica, CA (US)

(72) Inventor: Zachary McKeel Cava, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/017,499

(22) Filed: Sep. 10, 2020

(51) Int. Cl.
| H04N 7/16 | (2011.01) |
| H04N 21/239 | (2011.01) |
| H04N 21/8358 | (2011.01) |
| H04N 21/258 | (2011.01) |
| H04N 21/2343 | (2011.01) |

(52) U.S. Cl.
CPC ... *H04N 21/2396* (2013.01); *H04N 21/23439* (2013.01); *H04N 21/25816* (2013.01); *H04N 21/8358* (2013.01)

(58) Field of Classification Search
CPC ......... H04N 21/2396; H04N 21/23439; H04N 21/25816; H04N 21/8358
USPC .......................................................... 725/25
See application file for complete search history.

(56) References Cited

U.S. PATENT DOCUMENTS

| 1,292,083 | A | * | 1/1919 | Sawyer | A61F 5/08 606/199 |
| 1,805,640 | A | * | 5/1931 | Shindel | G02C 5/045 2/445 |
| 2,084,897 | A | * | 6/1937 | Dym | A61F 9/028 2/437 |
| 2,294,561 | A | * | 9/1942 | Kimball | G02C 5/045 2/445 |
| 2,386,175 | A | * | 10/1945 | Fischer | G02C 5/045 351/128 |
| 5,533,503 | A | * | 7/1996 | Doubek | A61F 5/08 128/200.24 |
| 5,635,978 | A | * | 6/1997 | Alten | H04N 7/0884 725/42 |
| 6,889,325 | B1 | * | 5/2005 | Sipman | G06Q 20/04 380/268 |
| 7,653,921 | B2 | * | 1/2010 | Herley | H04N 21/4756 725/19 |
| 7,913,326 | B1 | * | 3/2011 | Barrows | A61F 9/022 2/450 |
| 8,510,770 | B1 | * | 8/2013 | Oztaskent | H04H 60/72 725/21 |
| 11,005,908 | B1 | * | 5/2021 | Wu | H04N 21/6373 |

(Continued)

OTHER PUBLICATIONS

Akamai—"How to Add Watermaking", https://learn.akamai.com/en-us/webhelp/adaptive-media-delivery/adaptive-media-delivery-implementation-guide/GUID-3F89E64C-415D-452D-9541-BB650CD783B9.html, 2 pages, Sep. 10, 2020.

*Primary Examiner* — Michael B. Pierorazio
(74) *Attorney, Agent, or Firm* — Kwan & Olynick LLP

(57) ABSTRACT

In some embodiments, a method receives a request for a segment of video from a client. The request is associated with an identity. The method maps the segment to a variant value in a representation for the identity and selects a variant for the segment from a plurality of variants based on the variant value in the representation. A first segment of a first variant of the plurality of variants includes a first marker and a second segment of a second variant of the plurality of variants includes a second marker. The variant of the segment is then delivered to the client.

20 Claims, 9 Drawing Sheets

(56) References Cited

U.S. PATENT DOCUMENTS

| | | | |
|---|---|---|---|
| 2002/0072982 A1* | 6/2002 | Barton | G06Q 30/0251 705/14.1 |
| 2004/0055009 A1* | 3/2004 | Hayashida | H04N 5/44543 725/58 |
| 2004/0143349 A1* | 7/2004 | Roberts | G06F 16/634 700/94 |
| 2004/0163110 A1* | 8/2004 | Won | H04N 21/4314 725/40 |
| 2005/0028195 A1* | 2/2005 | Feinleib | H04N 21/4316 725/32 |
| 2005/0144455 A1* | 6/2005 | Haitsma | G06F 16/683 713/176 |
| 2005/0192863 A1* | 9/2005 | Mohan | G06Q 30/0217 705/14.19 |
| 2006/0098159 A1* | 5/2006 | Canavan | G02C 7/086 351/57 |
| 2006/0224452 A1* | 10/2006 | Ng | G06Q 30/0242 705/14.14 |
| 2006/0256133 A1* | 11/2006 | Rosenberg | G06F 3/013 345/619 |
| 2007/0124756 A1* | 5/2007 | Covell | H04N 7/17318 725/18 |
| 2007/0179850 A1* | 8/2007 | Ganjon | G06Q 30/0226 705/14.27 |
| 2007/0212019 A1* | 9/2007 | Kimura | H04N 21/4345 386/291 |
| 2008/0049704 A1* | 2/2008 | Witteman | H04H 60/58 370/342 |
| 2008/0082510 A1* | 4/2008 | Wang | H04H 60/40 |
| 2009/0313670 A1* | 12/2009 | Takao | H04N 21/8586 725/110 |
| 2010/0114713 A1* | 5/2010 | Anderson | G06Q 40/12 705/14.69 |
| 2011/0071838 A1* | 3/2011 | Li-Chun Wang | G11B 27/28 704/270 |
| 2011/0273455 A1* | 11/2011 | Powar | G10H 1/368 345/473 |
| 2011/0283319 A1* | 11/2011 | Davis | H04N 21/233 725/39 |
| 2012/0295560 A1* | 11/2012 | Mufti | H04B 13/00 455/95 |
| 2012/0297400 A1* | 11/2012 | Hill | G06F 16/748 719/318 |
| 2012/0316969 A1* | 12/2012 | Metcalf, III | G06Q 30/0269 705/14.66 |
| 2013/0029762 A1* | 1/2013 | Klappert | A63F 13/792 463/31 |
| 2013/0031579 A1* | 1/2013 | Klappert | H04N 21/454 725/32 |
| 2013/0042262 A1* | 2/2013 | Riethmueller | H04N 7/17318 725/14 |
| 2013/0044051 A1* | 2/2013 | Jeong | H04N 21/44218 345/156 |
| 2013/0067512 A1* | 3/2013 | Dion | G06Q 30/02 725/34 |
| 2013/0073366 A1* | 3/2013 | Heath | G06Q 30/0259 705/14.25 |
| 2013/0073377 A1* | 3/2013 | Heath | G06Q 30/02 705/14.39 |
| 2013/0080242 A1* | 3/2013 | Alhadeff | G06Q 30/0239 705/14.39 |
| 2013/0080262 A1* | 3/2013 | Scott | G06Q 30/02 705/14.68 |
| 2013/0085828 A1* | 4/2013 | Schuster | G06Q 50/01 705/14.25 |
| 2013/0111519 A1* | 5/2013 | Rice | G06Q 30/02 725/34 |
| 2013/0124073 A1* | 5/2013 | Ren | G08G 1/0112 701/118 |
| 2014/0115761 A1* | 5/2014 | McNeal | G02C 5/122 2/439 |
| 2014/0196070 A1* | 7/2014 | Moskowitz | H04N 21/8456 725/19 |
| 2015/0082349 A1* | 3/2015 | Ishtiaq | H04N 21/4884 725/40 |
| 2015/0143416 A1* | 5/2015 | Onno | H04N 21/44016 725/34 |
| 2015/0216710 A1* | 8/2015 | Wanderer | A61F 5/08 128/858 |
| 2015/0222950 A1* | 8/2015 | Sant | H04N 21/25883 725/18 |
| 2015/0229979 A1* | 8/2015 | Wood | H04N 21/2407 725/14 |
| 2018/0184160 A1* | 6/2018 | Cain | H04N 21/8358 |
| 2019/0313161 A1* | 10/2019 | Wilms | H04N 19/114 |

\* cited by examiner

| Bytes | 0x68756c7531323334 |
|---|---|
| Binary | 0110100001110101011011000111010100110001001100100011001100110100 |

302 — Bytes
304 — Binary

| User account ID | Bytes |
|---|---|
| User #1 | 0x68756c7531323334 |
| User #2 | 0x68756c7531323335 |
| User #3 | 0x68756c7531323336 |
| ... | ... |

FIG. 7

STATELESS RE-DISCOVERY OF IDENTITY USING WATERMARKING OF A VIDEO STREAM

BACKGROUND

Video delivery systems may be concerned with unauthorized distribution (e.g., video piracy) where a video stream has been captured by an unauthorized party or leaked by an authorized party. When the unauthorized distribution of a video is identified, the video delivery system may want to identify an identity, such as a user account, associated with the original stream that resulted in the unauthorized distribution. In some examples, a user account specific watermarking technique adds watermarks to segments of the video. The watermark may be information, such as a symbol or code, that is added to each segment and may be invisible to a user viewing the video. By analyzing a pattern of the watermarks in the video, the video delivery system may associate the video with a user account.

The video delivery system may include a fixed number of patterns that can be used to identify which user accounts and/or client devices played the stream. For example, the video delivery system may include a first copy of a video with segments that are marked with a watermark symbol of "A" and a second copy of the video with segments marked with a watermark symbol of "B". The video delivery system may deliver segments from the two copies to create different patterns of A and B symbols. The patterns may be declared before streaming of the video, such as at manifest generation, or generated dynamically (e.g., randomly or by an algorithm) during streaming of the video. Using the pre-declared patterns, each manifest that is sent to a client being used by a user account is specific to that user account. Also, using the dynamically generated patterns, the video delivery system has to record the unique string of the A/B pattern for each specific client device and user account. The above methods may limit the reuse of manifests in the pre-declared patterns or require a large amount of storage to log each unique A/B pattern for each client and user account. When the video delivery system is delivering a large number of videos to a large number of clients, using user specific manifests does not allow scaling, while using dynamically generated patterns requires a large amount of storage.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts an example of a user account identity structure according to some embodiments.

FIG. 7 depicts an example of user account identifier structures that are stored in storage according to some embodiments.

DETAILED DESCRIPTION

Described herein are techniques for a video delivery system. In the following description, for purposes of explanation, numerous examples and specific details are set forth to provide a thorough understanding of some embodiments. Some embodiments as defined by the claims may include some or all of the features in these examples alone or in combination with other features described below and may further include modifications and equivalents of the features and concepts described herein.

A video delivery system may receive a request to play a video from a client. Then, a server may send information (e.g., a manifest) that identifies a list of segments of a video that includes information for the client to use to download the segments of the video. The client may send a request for each segment, and subsequently receive the segment for playback. The client can communicate a user account identifier to the server when the request for a segment is sent.

When a server receives the request for the segment, the server can use the user account identifier to determine which segment from different variants (e.g., copies) of the video to send to the user. For example, the video may include a first variant of segments that may include a first marker (e.g., a watermark "A") and a second variant of segments that may include a second marker (e.g., a watermark "B"). Using the user account identifier, the server determines which variant of the segment to send to the client. As each segment is requested, the server maps information from the user identifier to a variant of the segment to send to the client. This forms a pattern of variants, such as a pattern of AB markers from the segments that are sent. An example of a pattern may be "AABA", which means a first segment from the A variant, a second segment from the A variant, a third segment from the B variant, and a fourth segment from the A variant are sent.

If the video delivery system wants to determine which user account was sent a stream that included the pattern of variants, the video delivery system can analyze the markers from the segments to determine a pattern of the variants. Then, the video delivery system can map the pattern to a user account identifier because the user account identifier was used to generate the pattern of variants. For example, a sequence of AB segment variants may represent a user account identifier. In this way, the video delivery system may identify the user account identifier from the pattern of segment variants. The video delivery system does not have to store which pattern was sent to the client for each video because the pattern of a stream maps to a user account identifier. Accordingly, the video delivery system may optionally store the user account identifier, but does not need to store more than one pattern for all content that is streamed to the user account.

System Overview

Figure 1:
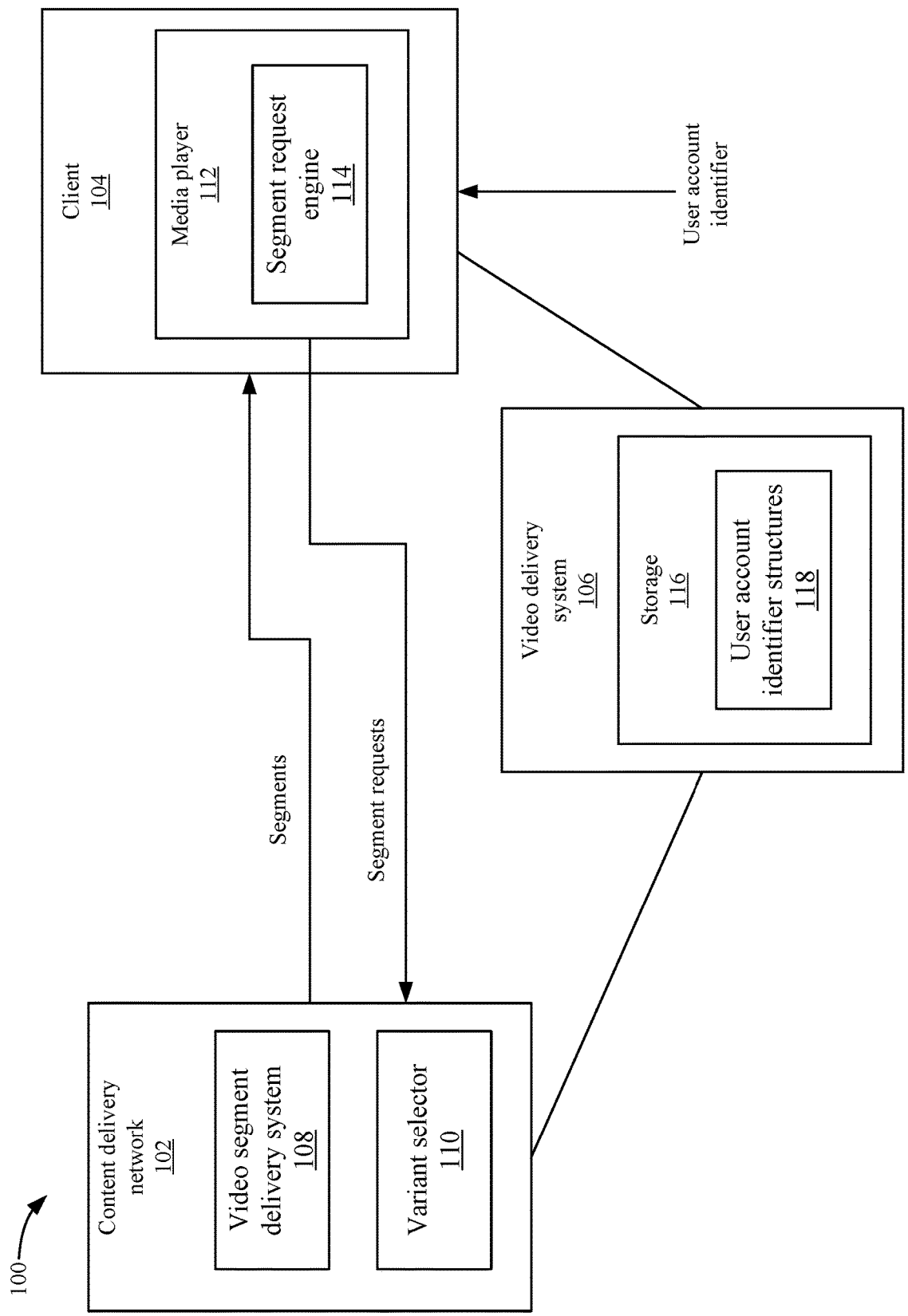
FIG. 1 depicts a simplified system for delivering videos with watermarks according to some embodiments.

FIG. 1 depicts a simplified system 100 for delivering videos with watermarks according to some embodiments. System 100 includes a content delivery network (CDN) 102, a client 104, and a video delivery system 106. Content delivery network 102 may include one or more computing devices, such as servers, that deliver videos to client 104. A video may include video and/or audio information. For example, content delivery network 102 may include a video segment delivery system 108 that delivers segments of videos to client 104. A segment of video may be a portion of a video, such as around four seconds of video, and a video may include multiple segments of video. It is noted that although an instance of content delivery network 102 is shown and an instance of client 104 is shown, content delivery network 102 may be delivering videos to multiple clients 104. Also, content delivery network 102 may include multiple computing devices, such an as origin server that may store videos, and edge nodes, which may be geographically distributed. The edge nodes may receive video segments from the origin server and deliver the segments to different clients 104. Any server in content delivery network 102 may perform the functions described herein.

Client 104 may include different computing devices, such as smartphones, living room devices, televisions, set top boxes, tablet devices, etc. Client 104 includes a media player 112 that can play a video. In some embodiments, media player 112 receives segments of a video and can play these segments. A segment request engine 114 may send segment requests to content delivery network 102, and then receive the requested segments for playback in media player 112.

Video delivery system 106 may provide a video delivery service that allows user accounts to request and receive videos, such as on-demand videos and live videos, from a library of content. The videos may be programs, such as movies, shows, advertisements, etc. Content delivery network 102 may deliver the videos for the video delivery service.

Video delivery system 106 may assign identities that identify an entity. For example, the identity may be user account identifiers that are associated with user accounts and/or clients 104 that use the video delivery service. The user accounts may be associated with users and the user account identifiers are used to access the video delivery service using client 104. A video delivery system may assign a unique user account identifier to a user account that is using the client. The user account identifier uniquely identifies the user account among user accounts being used by the video delivery system. Although user account identifiers are discussed, other types of identity information may be appreciated. As will be discussed in more detail below, video delivery system 106 may use the user account identifier to identify a pattern of segment variants that are sent in a stream to client 104.

Video delivery system 106 may include storage 116 that stores user account identifier structures 118. User account identifier structures 118 may include structures that identify the user accounts. In some embodiments, user account identifier structures 118 may be of a certain format that is used by content delivery network 102 to select a variant of a video to send to client 104. The user account identifier structure will be described in more detail below.

A video may include multiple variants that each include the same content of the video. However, each variant includes one or more variant specific markers, such as an associated watermark. In some embodiments, a watermark may be information that is added to one or more images that constitute a segment of video that identifies the variant. In some embodiments, the watermark may be information that is visible only to computing devices. That is, the watermark may not be visible in the image to a human being when played back by media player 112. Although a watermark that is not visible is discussed, other information may be appreciated, such as the watermark may be visible to human beings, and any type of information that distinguishes variants may be used, such as audio information (e.g., tones that are inaudible to a user), metadata, etc. The term watermark may be used for discussion purposes, but any type of marker may be used. A video may include any number of variants (e.g., two or more), such as an "A" variant and a "B" variant. The A variant may have a watermark of "A" added to images of the video and the B variant may have a watermark of "B" added to images of the variant. Although the A and B variants are described, a variant may include more than one watermark, but the watermarks correspond to a variant. For example, watermarks for the A variant may be A1, A2, A3, etc. for each consecutive segment. The watermark may be added to every segment. However, the watermark may be added to segments differently. For example, every image of a segment may include a watermark, only one image of a segment may include a watermark, or less than every image of a segment may include a watermark. If an audio mark is being used, only one audio mark may be added to a segment, an audio mark may be added at every X time interval, etc. Accordingly, different methods may be used to associate a segment with a watermark.

Client 104 may receive a user account identifier when a user account uses the video delivery service. For example, when the user account logs into the service, the application is sent the user account identifier or has stored the user account identifier for the user account. When media player 112 requests a video, content delivery network 102 may send a manifest that includes a list of segments for client 104 to download to playback the video on media player 112. Media player 112 may include a user account identifier in the request for the segment. Then, a variant selector 110 may determine a variant of the segment to include in the stream based on the user account identifier, the process of which will be described in more detail below.

Variant Processing

Figure 2:
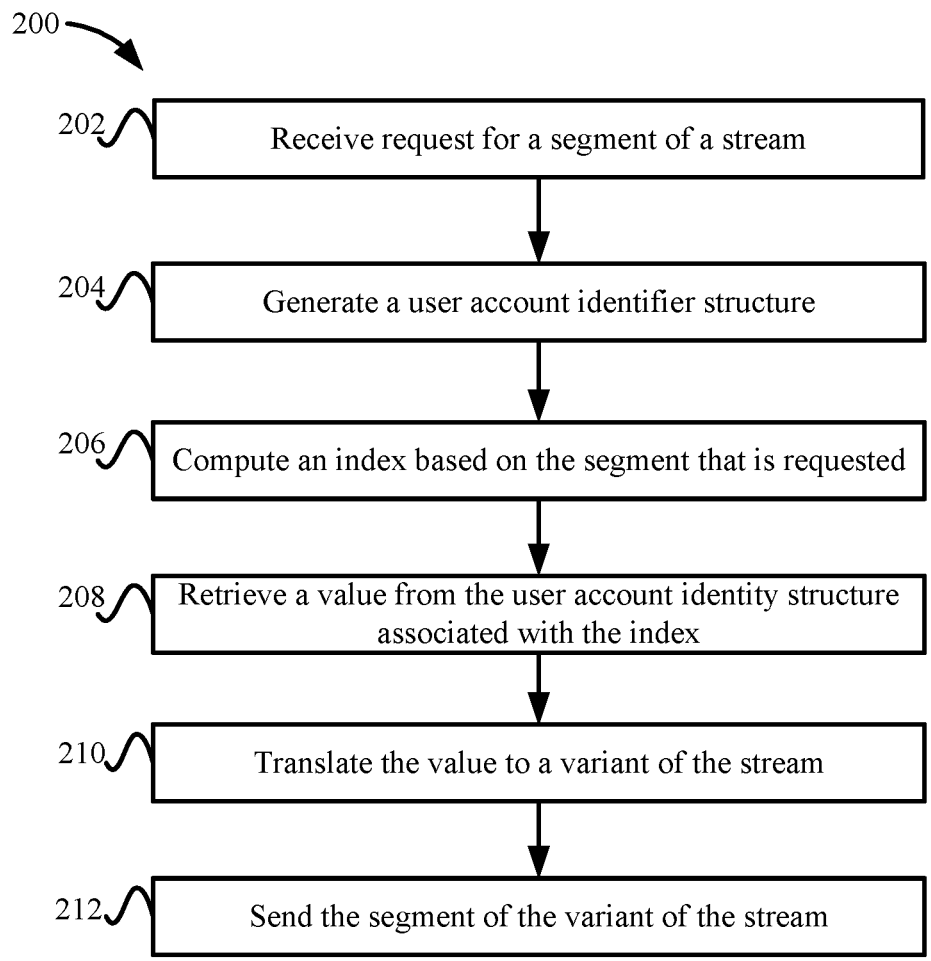
FIG. 2 depicts a simplified flowchart of a method for selecting a variant when sending a segment to a client according to some embodiments.

FIG. 2 depicts a simplified flowchart 200 of a method for selecting a variant when sending a segment to client 104 according to some embodiments. At 202, content delivery network 102 receives a request for a segment. For example, content delivery network 102 may send a manifest to client 104 for a video stream. The manifest identifies one or more segments that can be requested by client 104, such as via a link (e.g., a uniform resource locator (URL)). It is noted that throughout the playback of the video, content delivery network 102 may send multiple manifests that identify segments. Segment request engine 114 then sends a segment request to content delivery network 102. The segment request may identify the segment, such as using the URL, and also includes a user account identifier. This allows content delivery network 102 to associate the request with a user account. In some embodiments, client 104 adds the user account identifier in the request, such as be inserting the user account identifier into the link. Other ways of sending the user account identifier may be used, such as sending the user account identifier separately from the link, having another entity, such as video delivery system 106 send the user account identifier, etc. The following is an example of a segment request:

https://stream.hulu.com/3293288/
video_2000.mp4?identifier=1234&segment=66

In the segment request, the video is identified by the identifier "3293288". The video may be encoded into different profiles that include different bitrates and quality levels. The profiles may be identified differently, and the profile for the video is identified as the 2000 profile of "video 2000.mp4". Also, the segment is identified as segment #66 in the video. The number 66 identifies the number of the segment in the video, but other segment identifiers may be used, such as a time within the video. The user account identifier is "1234". In some embodiments, the user account identifier is provided with the segment request so that the system may be stateless. That is, content delivery network 102 can have any server (e.g., edge server) perform the processing without a shared state between all edge servers across requests or a call back to video delivery system 106 for every request to retrieve the identifier.

At 204, content delivery network 102 generates a user account identifier structure. In some embodiments, the user account identifier may be associated with a definition that identifiers the structure of the account identifier. In some embodiments, the user account identifier received from client 104 is in the defined structure and in other embodiments, variant selector 110 generates the structure. In some embodiments, structure may be a fixed length structure, but other structures may be appreciated. In some examples, a user account identifier structure 118 may be:

identity_struct{
   byte[Y] start marker;
   byte[Z] identifier;
}

The above structure includes two fields of a start marker and an identifier. The start marker may be a field, such as a multi-byte field, that contains a fixed and unique value that is used to delineate the structure's start. The start marker may be fixed and be the same for multiple user accounts. In other examples, the start marker may be different for different user accounts, and video delivery system 106 may store which start markers are associated with which user accounts. The identity structure may be a field, such as a multi-byte field, containing a representation, such as a binary representation, of the user account identifier. For example, the user account identifier of "1234" may map to a binary representation. The start marker may be used to mark the beginning of the identifier when a bit stream is being analyzed. Using the start marker may be helpful when analyzing a pattern for a video that has been played. The start marker is used to determine the beginning of the pattern such that the user account identifier can be determined after the start marker. Although a start marker is described, the start marker may be omitted. The total size of the user account identity structure may be X bytes where Y and Z are the fixed byte lengths of the marker field and the identifier field, respectively. The total size is: X bytes=Y bytes+Z bytes. The binary system may be used for two variant choices. When other numbers of variants are used, the structure may use a different format that can distinguish between the variant choices, such as four variants may use a base-4 numbering system. Also, other ways of mapping the user account identifier to the variants may be used, such as using a binary format to identify two variants and a special marker to identify another variant.

Content delivery network 102 may process the request and construct the identity_struct structure using the start marker and the user identifier in the request. FIG. 3 depicts an example of a user account identity structure according to some embodiments. A row 302 lists a first version of the user account identifier structure, such as the equivalent bytes of the user account identifier. In this case, the bytes are represented by "0x68756c7531323334". For example, the start marker may be "0x68756c75". The user identifier is "0x31323334", which is equivalent to "1234" in a hexadecimal value in an eight byte field. Variant selector 110 may concatenate the two identifiers, but other operations to combine the two identifiers may be used, such as adding or multiplying the identifiers.

LOOM A row 304 includes a second version of the user account identifier structure, such as the bit version of the bytes. For example, the bit version is: "011010000111010101101100011101010011000100110010001100110011010 0". The bit version is a binary sequence of the values "1" or "0". In some embodiments, the identifier may be 64 bits, which is equivalent to 8 bytes. However, the number of bits or bytes in the identifier may be different. Although a binary version of the user account identifier is described, other versions of the identifier may be used, such as an identifier of characters. Any information can be used for the user account identifier structure if the information maps to different variants.

Referring back to FIG. 2, at 206, variant selector 110 computes an index based on the segment that is requested. The index may be based on the segment number or a time within the video. For example, if segments are identified by a number, such as segment 66, then the index may be computed based on the value of "66". Also, if the time of the segment is identified as five minutes, then the index may be based on the value of five minutes into the video. The index is used to determine which information in the user account identifier structure to select for this segment.

At 208, variant selector 110 retrieves a value from user account identifier structure associated with the index. The value may be a bit value from the user account identity structure. However, other methods may be used, such as inputting the index into a function that outputs a value based on the user account identity structure. At 210, variant selector 110 translates the value to the variant of the stream. For example, a value of "0" maps to a variant of A and a value of "1" maps to a variant of "B". This process continues for each segment that is requested by client 104 and content delivery network 102 sends the respective segment variant that is determined to client 104 at 212.

Figure 4:
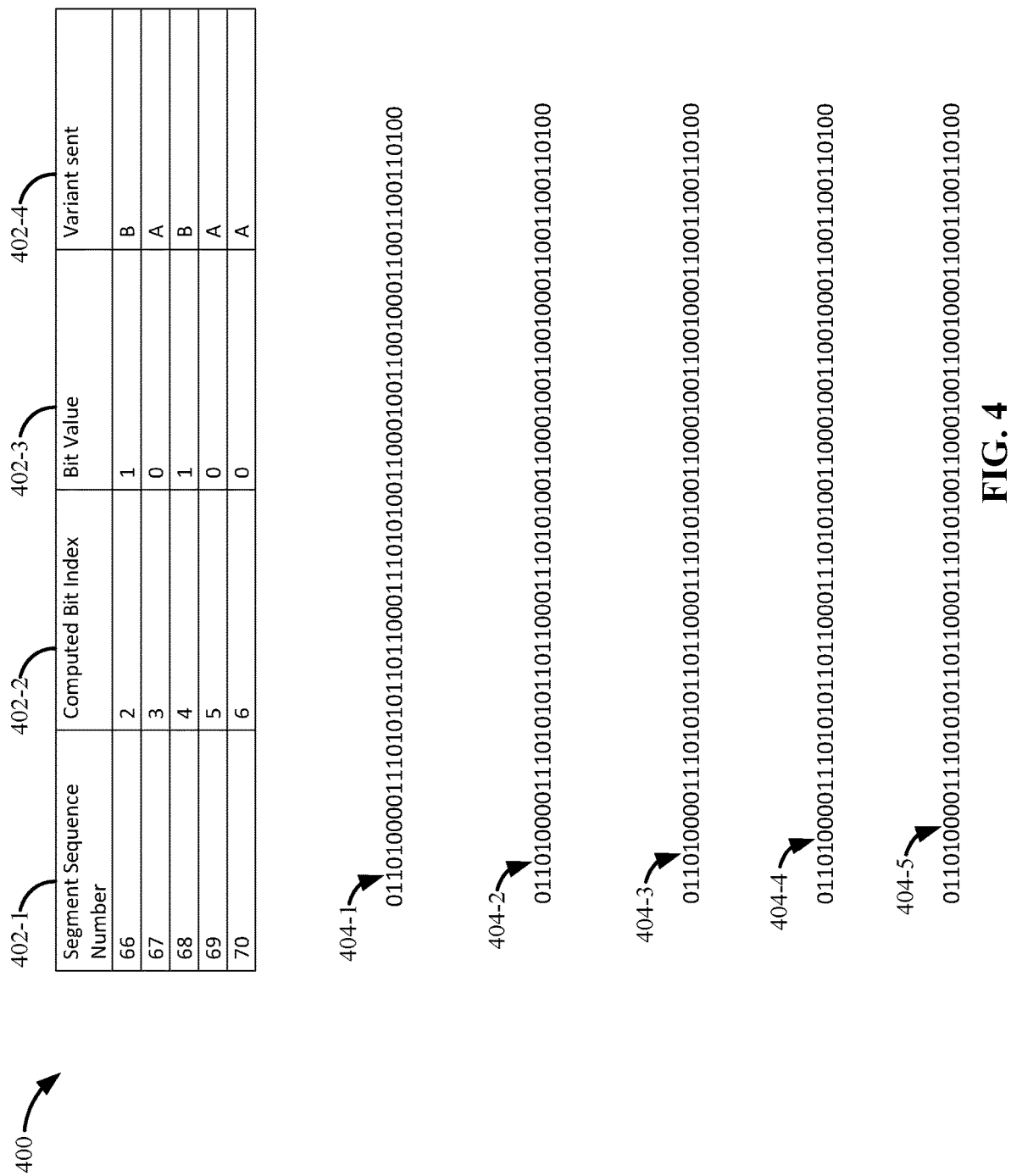
FIG. 4 depicts an example of determining the index and retrieving a value from the user account identity structure according to some embodiments.

FIG. 4 depicts an example of determining the index and retrieving a value from the user account identity structure according to some embodiments. A table 400 illustrates information that may be used to determine the variant to send according to some embodiments. Table 400 includes a column 402-1 that identifies the segment sequence number; a column 402-2 identifies a computed bit index; a column 402-3 identifies a bit value; and a column 402-4 identifies a variant to send. In a first row, the segment sequence number is 66, which is the 66$^{th}$ segment of the video. Variant selector 110 computes a bit index from the segment sequence identifier. In some embodiments, variant selector 110 calculates the computed bit index based on a formula, such as a modulo of the segment sequence number. A modulo may be a remainder that results after a division by a number. In some embodiments, variant selector 110 calculates the modulo by dividing the segment sequence number by a number of bits in the user account identity structure, which is 64. In this case, the remainder is "2" after the number 66 is divided by 64. Although the above method is described as being used to determine the bit index, other methods may be used, such as using a function that outputs the bit index based on the segment value. The use of the modulo is used because the pattern of variants for the user account identifier repeats every X segments. The remainder continues to identify the index in the user account identifier structure as the number of segments increases. For example, the segment 2 and the segment 66 point to the same index, the segment 3 and the segment 67 point to the same index, and so on.

The bit index corresponds to a bit in the binary identifier for the user account. The bits in the user account identity structure may start at a bit index of 0 and end at a bit index of 63. For example, at 404-1, the bit index of "2" is shown, which is the third bit in the binary user account identifier and has the value of "1". This bit value of "1" is shown in column 402-3 for the bit index of 2.

In some embodiments, the A variant of the video is selected when the bit value is "0" and the B variant is selected when the bit value is "1". Because binary numbers are being used, the bit value may be only a "0" and "1". However, if more variants are being used, values other than binary numbers may be used. For example, values from the user account identifier structure may map to three different variants.

Continuing with segment sequence number 67, the modulo of 67/64 is "3". The bit index of 3 is shown at 404-2, which is the value of "0". At 402-4, variant selector 110 selects the variant as the A variant because the bit value is 0. Moving on to segment sequence #68, the computed bit index is "4". At 404-3, the bit index of 4 corresponds to the value of "1". Accordingly, variant selector 110 selects the B variant of the video. At sequence segment #69, the computed bit index is "5", which is shown at 404-4 and is the bit value of "0". Variant selector 110 selects the A variant because the bit value is 0. For the sequence segment number of 70, the computed bit index is "6" and the bit value of "0" is shown at 404-5 in the user account identifier. Variant selector 110 selects the A variant in this case.

Content delivery network 102 sends a segment of the variant to stream for each segment request. In the above example, the variants of "BABAA" are sent for the segments 66, 67, 68, 69, and 70, respectively.

Figure 5:
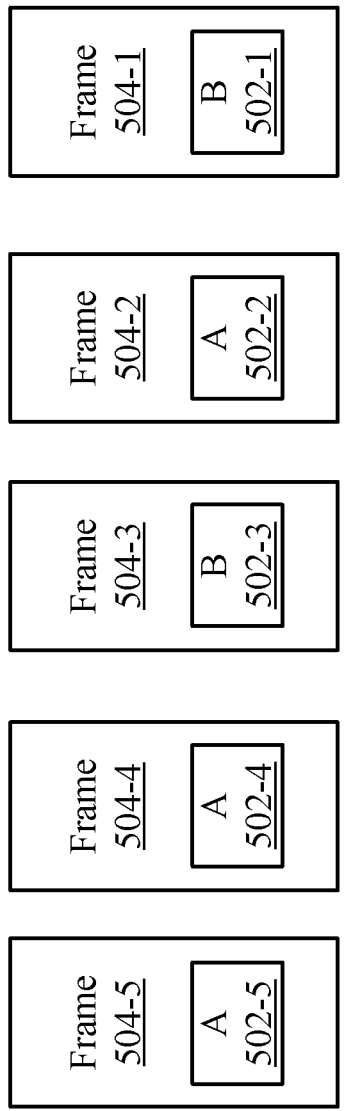
FIG. 5 depicts an example of the variants of segments that are sent to the client according to some embodiments.

FIG. 5 depicts an example of the variants of segments that are sent to client 104 according to some embodiments. A set of frames 504-1 include a marker 502-1 that is a B variant. A frame may be an image in the video and one or more frames in the segment may include marker 502-1. Similarly, a set of frames 504-2 include a marker 502-2 that is an A variant, and set of frames 504-3, 504-4, and 504-5 include markers 502-3 (B variant), 502-4 (A variant), and 502-5 (A variant), respectively. This forms the pattern of "BABAA". The process continues to send variants of the video as multiple segments are requested. For the course of the stream playout, a full sequence of AB variants representing the user account identifier would be included many times. For example, a full sequence is repeated every 64 segments.

User Account Identity Detection

Figure 6:
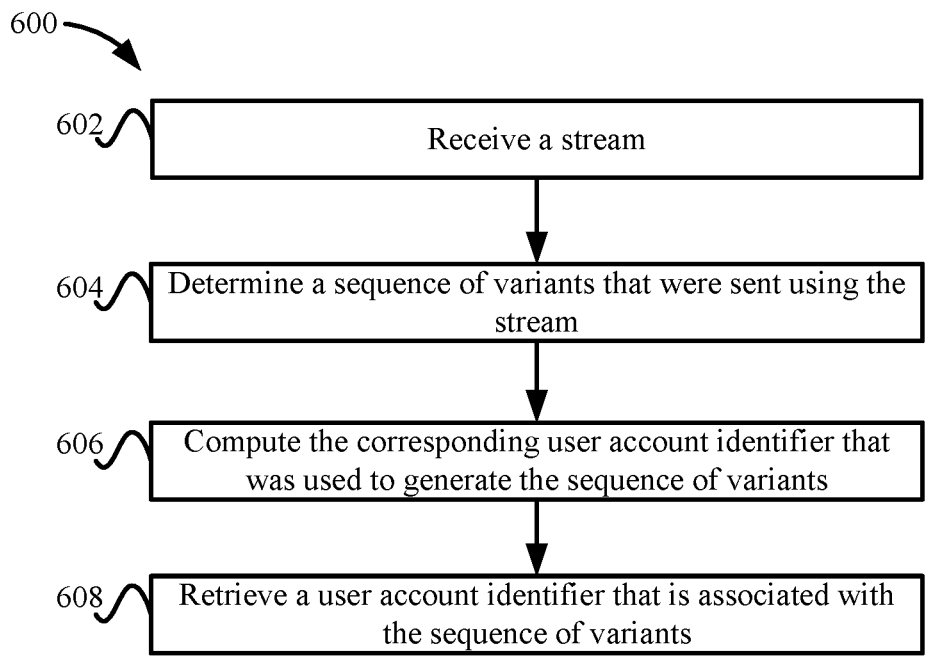
FIG. 6 depicts a simplified flowchart of a method for identifying the user account identifier from a sequence of variants for a stream according to some embodiments.

At some point, video delivery system 106 may desire to determine the user account identifier associated with a video stream. FIG. 6 depicts a simplified flowchart 600 of a method for identifying the user account identifier from a sequence of variants for a stream according to some embodiments. At 602, video delivery system 106 receives a stream for a video that was played back. For example, video delivery system 106 may want to inspect a stream as possibly being distributed without authorization.

At 604, video delivery system 106 determines a sequence of variants that were sent using the stream. For example, the sequence may be a series of A/B values and video delivery system 106 determines the sequence from markers in the segments of the video. At 606, video delivery system 106 computes the corresponding user account identifier that was used to generate the sequence of variants. For example, video delivery system 106 may use 64 values for the variants in 64 segments to generate a bit string of bit values. In this case, video delivery system 106 may generate a 64-bit value of the values "1" or "0".

In some embodiments, video delivery system 106 may translate the 64-bit value to a byte value, but this may not be necessary. It will depend on how the user account identifier structures are stored in storage 116. FIG. 7 depicts an example of user account identifier structures that are stored in storage 116 according to some embodiments. A table 700 depicts user account identifiers and corresponding byte values. In analyzing the sequence of markers, the first 32 A/B values translate to the start marker sequence and the next 32 A/B values translate to the unique user account identifier. The column 702-1 depicts the user account identifiers and a column 702-2 depicts the corresponding bytes for the user account identifiers. For example, the user #1 has the corresponding byte value of "0x68756c7531323334"; user #2 has the corresponding byte value of "0x68756c7531323335"; user #3 has the corresponding byte value of "0x68756c7531323336", and so on.

Referring back to FIG. 6, at 608, video delivery system 106 retrieves the user account identifier that is associated with the sequence of variants. For example, if the byte value is "0x68756c7531323334", then video delivery system 106 retrieves the user account identifier of user #1, and if the byte value is "0x68756c7531323335", video delivery system 106 retrieves the user account identifier of user #2, and so on.

While the above user identity structures are described, the process may be used for any number of pattern variants and different types of identifier structures. For example, the identifier structures may omit a start marker. The start of identifier may be identified by a fixed stream time, segment sequence, or omitted should the marker uniqueness be guaranteed against the identifiers. That is, a start marker identifies within the start of the user account identifier structure in the stream of segments, but may not be needed to identify the start of the user account identifier if some other information is used.

Also, error correction may be used if one or more bits of the stream result in a wrong variant or a missing variant. For example, if one or more bits of the bit pattern are wrong, video delivery system 106 may be able to correct some of the bits that are wrong. Video delivery system 106 may use different error correction methodologies, such as error correction codes, forward error correction, checksums, and/or parity bits to provide error correction functionality to the watermarking system.

When 64 bits are used as the user account bit stream, this will require 64 segments to be received by client 104 in the stream. In some embodiments, if a segment is an average of four seconds per segment, this is about four-and-a-half minutes of playback to provide a complete AB sequence that would match the user account identifier. In some examples, if the sequence did not start from bit 0, it is possible that a longer number of segments may be needed to determine the full sequence from bit 0 to bit 63. The amount of stream time needed to embed the information can be increased or decreased with a corresponding change to the amount of binary data needed to encode the identifier structure. Also, the markers may be distributed across video and audio. For example, images of video may identify the even bits and audio information may be used to identify the odd bits in the binary identifier.

Conclusion

Accordingly, the amount of storage that is required to store patterns for the sequence of variants that is delivered for a video is reduced. The embedding of a user account identifier in a segment request allows content delivery network 102 to identify the user account that is using client 104 and receiving the video segments. Translation of the user account identifier into a pattern of variants is then used when delivering segments of the video to client 104. Accordingly, video delivery system 106 stores the user account identifier for user accounts and can associate a pattern of variants for any stream that is played out for that user account to that user account. This reduces the amount of storage needed because specific patterns that are used for specific videos do not need to be stored. Also, the identification of which user account is associated with a stream is also simplified as the translation from the pattern to the user account identifier is only needed to identify the user account.

Example Embodiments

In some embodiments, a method comprising: receiving, by a computing device, a request for a segment of video from a client, wherein the request is associated with an identity; mapping, by the computing device, the segment to a variant value in a representation for the identity; selecting, by the computing device, a variant for the segment from a plurality of variants based on the variant value in the representation, wherein a first segment of a first variant of the plurality of variants includes a first marker and the first segment of a second variant of the plurality of variants includes a second marker; and delivering, by the computing device, the variant of the segment to the client.

In some embodiments, the first variant includes a first plurality of segments associated with the first marker, and the second variant includes a second plurality of segments associated with the second maker.

In some embodiments, the method further comprising: delivering multiple segments selected from different variants in the plurality of variants, wherein the different variants are selected based on different variant values that are mapped from the identity.

In some embodiments, the request includes a link for the segment of video, and the identity is included in the link.

In some embodiments, mapping the segment to the variant value in the representation comprises: converting the segment to an index value; and using the index value to determine the variant value from the representation.

In some embodiments, the variant value maps to one of the plurality of variants.

In some embodiments, the method further comprising: generating representation from the identity, wherein the index value maps to a variant value in the representation.

In some embodiments, the representation of the identity comprises a series of variant values, and the segment is mapped to one of the variant values.

In some embodiments, the representation of the identity comprises a series of bit values, the segment maps to one of the bit values, and the bit value is mapped to one of the variants in the plurality of variants.

In some embodiments, the representation comprises a first portion and a second portion, and the first portion is fixed for multiple identities and the second portion is identity specific.

In some embodiments, the first portion is used to identify a start of a sequence of variants, and the second portion comes after the first portion in the sequence of variants.

In some embodiments, a pattern of variants is sent for the video based on which variant in the plurality of variants is selected for a plurality of segments in the video.

In some embodiments, the pattern corresponds to the identity.

In some embodiments, the identity is associated with an account identifier that used the client to playback the video.

In some embodiments, a non-transitory computer-readable storage medium containing instructions, that when executed, control a computer system to be operable for:

In some embodiments, a method comprising: receiving, by a computing device, a plurality of segments from a video; identifying, by the computing device, a pattern of variant values from the plurality of segments, wherein a first segment of a first variant of the plurality of variants includes a first marker and a second segment of a second variant of the plurality of variants includes a second marker; mapping, by the computing device, the pattern of variant values to an identity structure that was used to select the variants from the plurality of variants for the plurality of segments; and using, by the computing device, identity structure to determine an identity of an entity that received the video.

In some embodiments, the method further comprising: retrieving an account from a plurality of accounts based on the identity, wherein each account is associated with a unique identifier structure that is mapped to a pattern of variant values.

In some embodiments, each variant value in the pattern of variant values maps to a bit value in the identity structure.

In some embodiments, the identity structure comprises a first portion and a second portion, and the first portion is fixed for multiple identities and the second portion is identity specific.

In some embodiments, the first portion is used to identify a start of the identity structure in the pattern of variant values from the plurality of segments.

System

Figure 8:
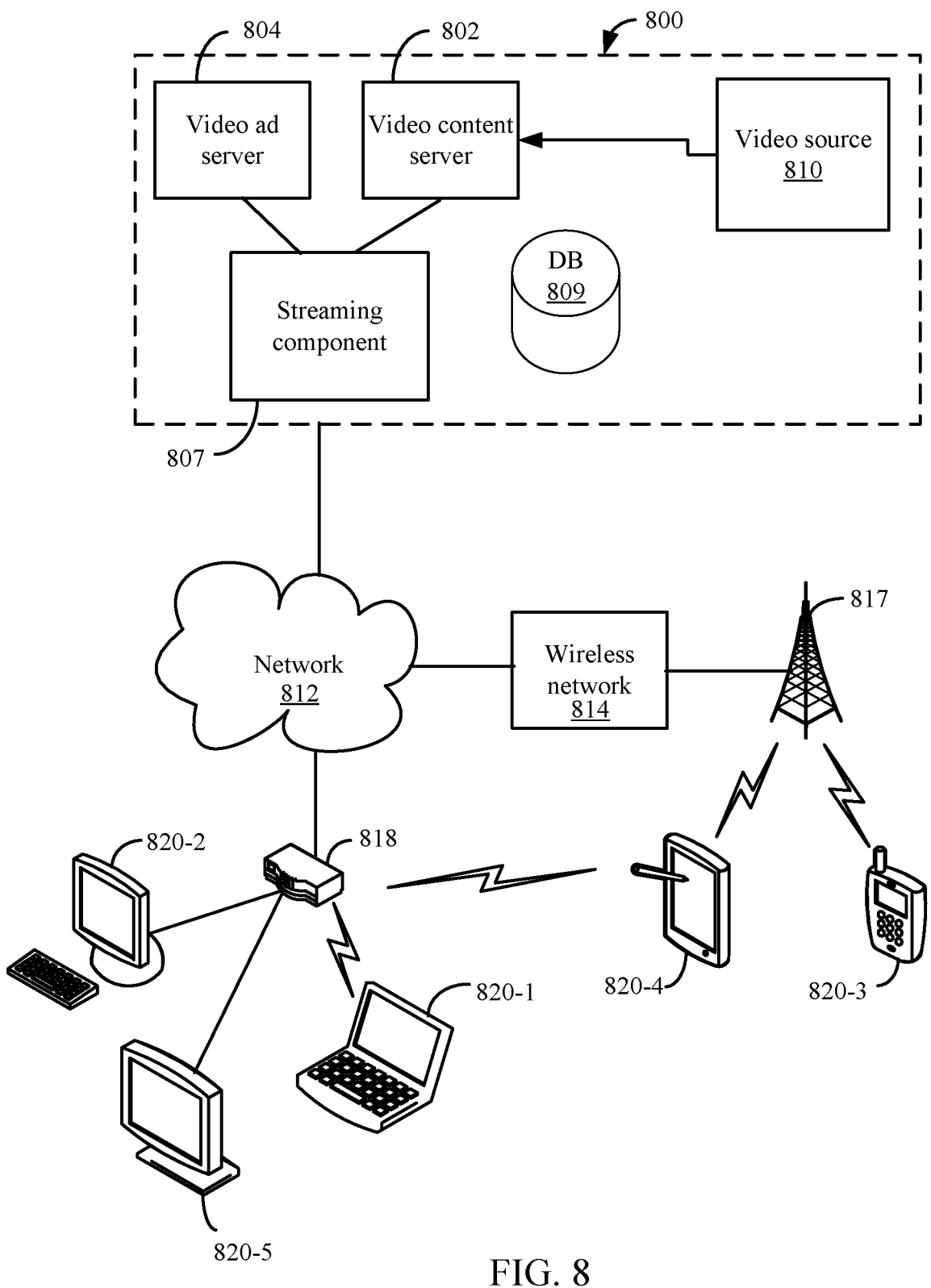
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
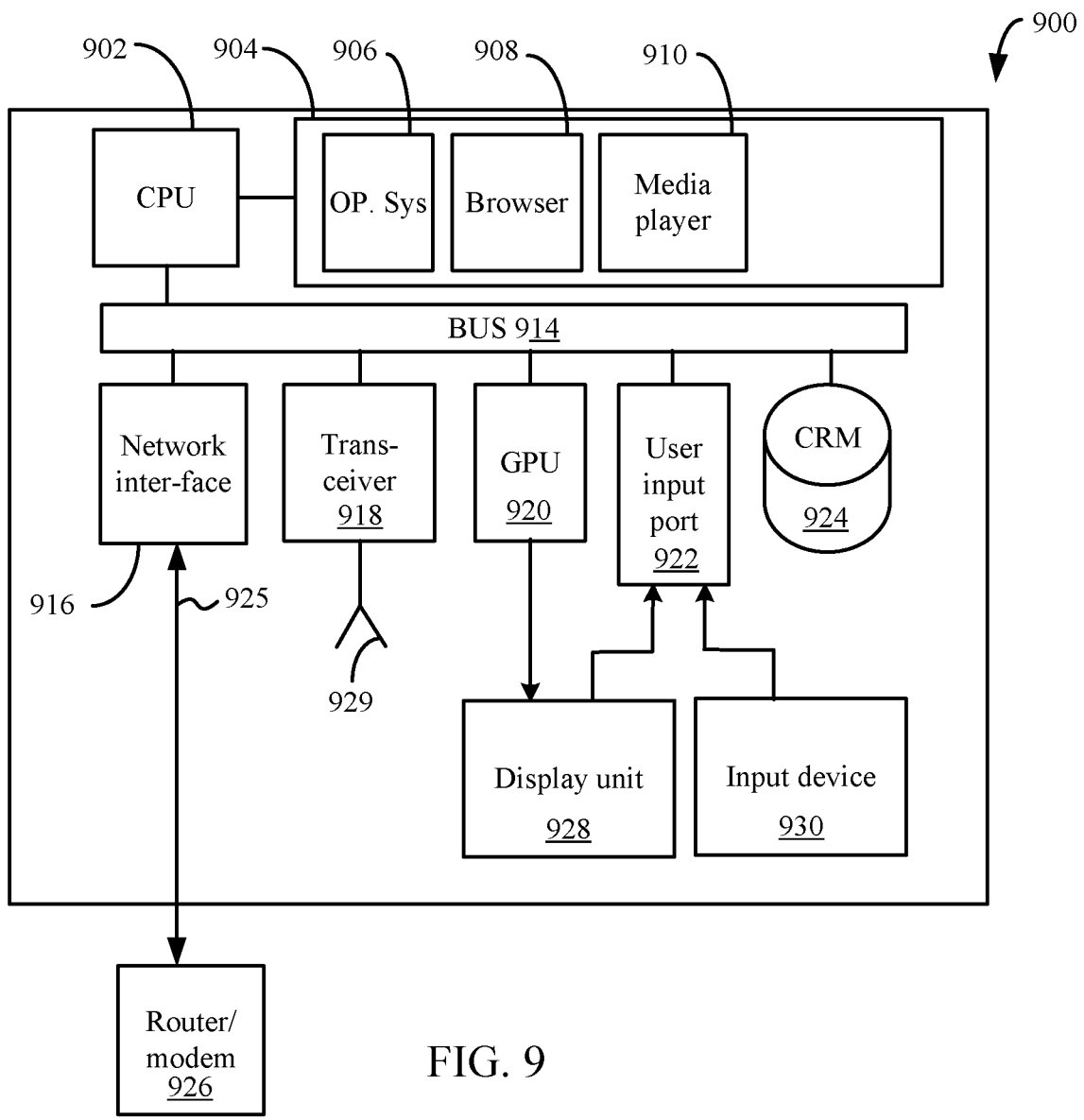
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a computing device, an identity for a client in which to deliver a plurality of segments of a video, wherein the identity maps to a plurality of variant values;
for the plurality of segments:
mapping, by the computing device, a respective segment to a variant value in the representation for the identity; and
selecting, by the computing device, a variant for the segment from a plurality of variants based on the variant value in the representation, wherein a first segment of a first variant of the plurality of variants includes a first marker and the first segment of a second variant of the plurality of variants includes a second marker; and
delivering, by the computing device, the variant that is selected for the plurality of segments to the client.

2. The method of claim 1, wherein:
the first variant includes a first plurality of segments associated with the first marker, and
the second variant includes a second plurality of segments associated with the second marker.

3. The method of claim 1, wherein the different variants for the plurality of segments are selected based on different variant values that are mapped from the identity.

4. The method of claim 1, further comprising:
receiving a request that includes a link for a segment in the plurality of segments, and
the identity is included in the link.

5. The method of claim 1, wherein mapping the respective segment to the variant value in the representation comprises:
converting a respective segment to an index value; and
using the index value to determine the variant value for the respective segment from the representation.

6. The method of claim 5, wherein the variant value maps to one of the plurality of variants.

7. The method of claim 5, further comprising:
generating the representation from the identity, wherein the index value maps to a variant value in the representation.

8. The method of claim 1, wherein:
the representation of the identity comprises a series of variant values, and
the plurality of segments are mapped to one of the variant values.

9. The method of claim 1, wherein:
the representation of the identity comprises a series of bit values,
each segment maps to one of the bit values, and
the bit value is mapped to one of the variants in the plurality of variants.

10. The method of claim 1, wherein:
the representation comprises a first portion and a second portion, and
the first portion is fixed for multiple identities and the second portion is identity specific.

11. The method of claim 10, wherein:
the first portion is used to identify a start of a sequence of variants, and
the second portion comes after the first portion in the sequence of variants.

12. The method of claim 1, wherein a pattern of variants is sent for the video based on which variant in the plurality of variants is selected for the plurality of segments in the video.

13. The method of claim 12, wherein the pattern corresponds to the identity.

14. The method of claim 1, wherein the identity is associated with an account identifier that used the client to playback the video.

15. A non-transitory computer-readable storage medium containing instructions, that when executed, control a computer system to be operable for:
receiving an identity for a client in which to deliver a plurality of segments of a video, wherein the identity maps to a plurality of variant values;
for the plurality of segments:
mapping a respective segment to a variant value in the representation for the identity; and
selecting a variant for the segment from a plurality of variants based on the variant value in the representation, wherein a first segment of a first variant of the plurality of variants includes a first marker and the first segment of a second variant of the plurality of variants includes a second marker; and
delivering the variant that is selected of for the plurality of segments to the client.

16. A method comprising:
receiving, by a computing device, a plurality of segments from a video;
identifying, by the computing device, a variant value for respective segments in the plurality of segments;
identifying, by the computing device, a pattern of variant values from the variant values for the respective segments in the plurality of segments, wherein a first segment of a first variant of the plurality of variants includes a first marker and a second segment of a second variant of the plurality of variants includes a second marker;
mapping, by the computing device, the pattern of variant values to an identity structure for a client in which the plurality of segments from the video were delivered, wherein the identity structure maps to the variants from the plurality of variants for the plurality of segments; and
using, by the computing device, identity structure to determine an identity of an entity that received the video.

17. The method of claim 16, further comprising:
retrieving an account from a plurality of accounts based on the identity, wherein each account is associated with a unique identifier structure that is mapped to a pattern of variant values.

18. The method of claim 16, wherein each variant value in the pattern of variant values maps to a bit value in the identity structure.

19. The method of claim 16, wherein:
the identity structure comprises a first portion and a second portion, and
the first portion is fixed for multiple identities and the second portion is identity specific.

20. The method of claim 16, wherein the first portion is used to identify a start of the identity structure in the pattern of variant values from the plurality of segments.

* * * * *